United States Patent [19]

Okamoto et al.

[11] 4,454,439
[45] Jun. 12, 1984

[54] AIR GAP WINDING ROTATING ELECTRIC MACHINE

[75] Inventors: Kouichi Okamoto; Mitsuhiro Uchida, both of Kobe; Tatsuei Nomura, Itami, all of Japan

[73] Assignee: Mitsubishi Denki Kabushiki Kaisha, Tokyo, Japan

[21] Appl. No.: 470,491

[22] Filed: Feb. 28, 1983

[30] Foreign Application Priority Data

Mar. 8, 1982 [JP] Japan ................................. 57-37666
Mar. 8, 1982 [JP] Japan ................................. 57-37667

[51] Int. Cl.³ ............................................. H02K 1/00
[52] U.S. Cl. ..................................... 310/179; 310/42; 310/192; 310/214; 29/596
[58] Field of Search ................. 310/179, 192, 194, 43, 310/42, 45, 214, 254, 258, 259, 216–218; 219/596; 336/197

[56] References Cited

U.S. PATENT DOCUMENTS 3,082,337  3/1963  Horsley .............................. 310/179
3,876,893  4/1975  Ross ................................... 310/258
4,179,635 12/1979  Beermann ......................... 310/214
4,184,091  1/1980  Khutoretsky ...................... 310/214

FOREIGN PATENT DOCUMENTS 50-136602 10/1975 Japan ................................. 310/179

*Primary Examiner*—R. Skudy
*Attorney, Agent, or Firm*—Wenderoth, Lind & Ponack

[57] ABSTRACT

In large capacity and superconducting rotating electric machines, the stator coil windings are frequently placed in the air gap between the stator core and the rotor. This so-called air gap winding rotating electric machine has the drawback that reliably securing the stator coils to the stator core is difficult. In the air gap winding rotating electric machine according to the present invention, the stator coils are disposed between the outer circumference of a thin-walled electrically insulating cylinder surrounding the rotor and the inner circumference of the magnetic shield on the stator side. Taper keys are inserted between the outer circumference of the stator coils and the inner circumference of the magnetic shield so as to firmly press the stator coils against the thin-walled electrically insulating cylinder. In this manner, the stator coils can be easily and reliably secured to the stator.

8 Claims, 9 Drawing Figures

AIR GAP WINDING ROTATING ELECTRIC MACHINE

BACKGROUND OF THE INVENTION

This invention relates to rotating electric machines, and in particular to an air gap winding rotating electric machine in which the stator coils can be rigidly and reliably secured to the stator side.

In recent years, air gap winding rotating electric machines have become increasingly common. The main feature of this type of machine is that the stator core has no slots for the disposition of the stator coils. Instead, the stator coils are placed in the space (i.e. the air gap) between the stator core and the rotor. Placing the stator coil windings in the air gap makes efficient use of empty space and increases the magnetic flux density of the stator coils. Their disposition in the air gap is particularly advantageous in large capacity and superconducting rotating electric machines.

However, air gap winding rotating electric machines have the disadvantage that reliably securing the stator coils to the stator core is very difficult. The method used in the prior art of disposing the stator coils in an air gap winding rotating electric machine is to directly bond the stator coils to the stator core using a strong adhesive, such as a resin adhesive. However, a sufficiently strong bond can not be obtained between the stator core and stator coils, and the large forces exerted on the stator coils during operation can result in loosening and unacceptable vibration of the stator coils, damage to the insulation surrounding the coils, and similar problems resulting in machine failure.

OBJECT OF THE INVENTION

It is the object of the present invention to provide an air gap winding rotating electric machine in which the stator coils are securely and reliably disposed in the air gap such that the stator coils will not become loose during operation. In the present invention, the stator coils are disposed between the magnetic shield on the stator side of the rotating electric machine and the outer circumference of a thin-walled insulating cylinder which surrounds the rotor. The stator coils are held firmly in place against the outer circumference of the thin-walled insulating cylinder by taper keys inserted between the inner circumference of the magnetic shield and the outer circumference of the stator coils.

DESCRIPTION OF THE PREFERRED EMBODIMENTS

Figure 1:
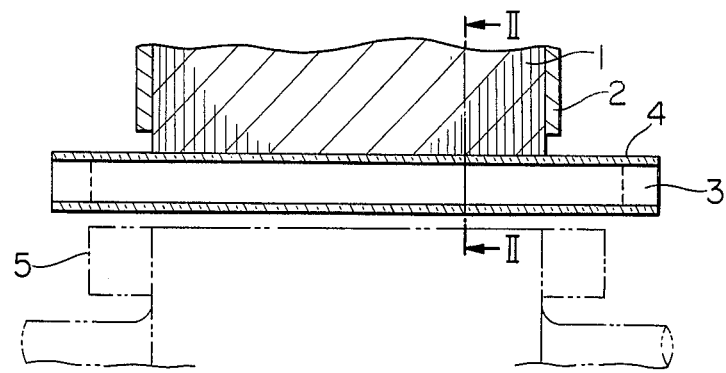
FIG. 1 is a longitudinal cross-sectional profile of an air gap winding rotating electric machine according to the prior art.
Figure 2:
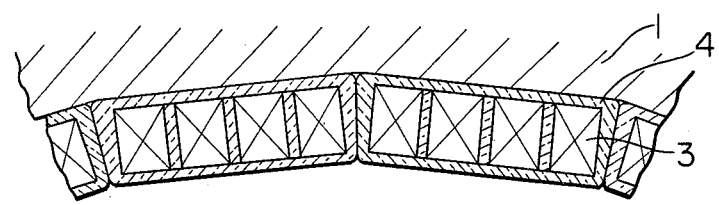
FIG. 2 is a view taken along the line II—II of FIG. 1, showing the disposition of the stator coils in the prior art rotating electric machine of FIG. 1.

FIGS. 1 and 2 show partial views of an air gap winding rotating electric machine according to the prior art.

In the figures, 1 is a magnetic shield comprising a large number of metal plates (for example, silicon steel plates) laminated together to form a hollow cylinder disposed inside the stator frame (not shown in drawings). The magnetic shield 1 possesses no slots. 2 indicates end plates which restrain both ends of the magnetic shield 1. 3 indicates stator coils disposed on the inside of the magnetic shield 1, forming a single layer chain winding. 4 is electrical insulation wrapped about groups of stator coils, and 5 is the rotor in which the field coil is located.

In the illustration, four sets of stator coils 3 are wrapped in the electrical insulation 4 to form a single wedge-shaped group, which is then fitted into the multifaced inner surface of the magnetic shield 1 and secured thereto with an adhesive.

Now, a first embodiment of an air gap winding rotating electric machine according to the present invention will be described while referring to FIGS. 3 and 4. 11 is a slotless, laminated magnetic shield similar to the magnetic shield 1 of FIGS. 1 and 2, disposed inside a stator frame (not shown). 2 indicates end plates restraining both end surfaces of the magnetic shield 11.

5 is a rotor.

12 is a thin-walled, electrically insulating cylinder coaxial with and substantially surrounding but not in contact with the rotor 5. The insulating cylinder 12 is formed from an insulating material having high mechanical strength, high resistance to heat, and good electrical insulating properties, such as epoxy resin fiber glass or epoxy resin glass cloth formed into a hollow cylinder. 13 are sets of stator coils disposed about the outer circumference of the insulating cylinder 12. FIGS. 3 and 4 illustrate the case where each set of coils consists of an outer group of coils 13a and an inner group 13b separated by a layer-separating electrically insulating plate 6.

7 indicates electrically insulating members inserted about the outer circumference of the inner cylinder 12 between adjacent sets of stator coils 13.

14 indicates outer electrically insulating plates extending in the axial direction, disposed all around the outer circumference of the stator coils 13. The outer insulating plates 14 are made from a material with high strength, high resistance to heat, and good electrical insulating properties, such as epoxy resin glass cloth laminate.

17 are pairs of taper keys inserted between the inner circumferential surface of the magnetic shield 11 and the outer circumferential surface of the outer electrically insulating plates 14, each pair of taper keys aligned parallel to the axis of the rotor 5. As shown in FIG. 3, each pair comprises an outer taper key 17a and an inner taper key 17b of similar shape, the two taper keys disposed so that the outer surface of the outer taper key 17a (the surface in contact with the magnetic shield 11) is parallel to the inner surface of the inner taper key 17b (the surface in contact with the outer electrically insulating plate 14). The taper keys 17 are made of a material of high mechanical strength with high resistance to heat and good electrical insulating properties, such as epoxy resin glass cloth laminate.

Figure 5:
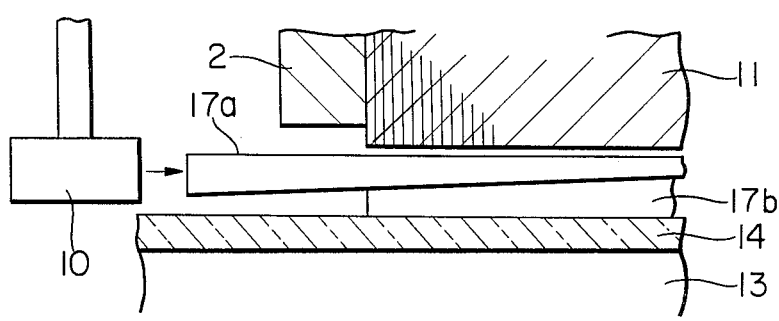
FIG. 5 is a longitudinal cross-sectional view of the embodiment of FIG. 3, showing the installation of taper keys.

The sets of stator coils 13 are installed in the following manner. First, sets of stator coils 13 are evenly disposed about the outer circumference of the insulating cylinder 12. An electrically insulating plate 6 is then inserted into each set of stator coils 13 to divide it into an outer group 13a and an inner group 13b. Electrically insulating members 7 are then fitted between adjacent sets of stator coils 13. Outer electrically insulating plates 14 are then applied to the outer circumferential surface of the stator coils 13 so as to cover both the stator coils 13 and electrically insulating members 7. The cylindrical body thus formed is then inserted into the cylindrical cavity in the center of the magnetic shield 11. Into the space between the outer circumference of the outer electrically insulating plates 14 and the inner circumference of the magnetic shield 11, pairs of taper keys 17 are inserted from both axial directions about the entire circumference. Insertion of the taper keys 17 is accomplished by pounding the end surface of the outer taper key 17a with a mallet 10, as shown in FIG. 5. After being driven into place, appropriate restraining means (not shown in the figures) are installed against the outer ends of the taper keys 17 to prevent their movement in the axial direction.

The axial force applied to the taper keys 17 when pounding them into place results in radially compressive forces being exerted upon the outer electrically insulating plates 14 and upon the stator coils 13. This compressive force holds the stator coils firmly and reliably in place against the insulating cylinder 12.

The material comprising the insulating cylinder 12 has a low Young's modulus. For example, epoxy resin fiber glass has a Young's modulus of 2000 kg/mm$^2$. When compressed by the radial force from the taper keys 17 the diameter of the insulating cylinder 12 decreases by several millimeters. This change in diameter is greater than the magnitude of any reduction in the dimensions thereof due to shrinkage over the years, and there will always be a strong compressive force between the insulating cylinder 12 and the stator coils 13. Thus, no loosening of the stator coils 13 can be expected, even over long periods.

However, if for some reason, such as improper assembly, the stator coils 13 do become loose during use, the taper keys 17 can easily be pounded into place again so as to firmly secure the stator coils 13.

Figure 3:
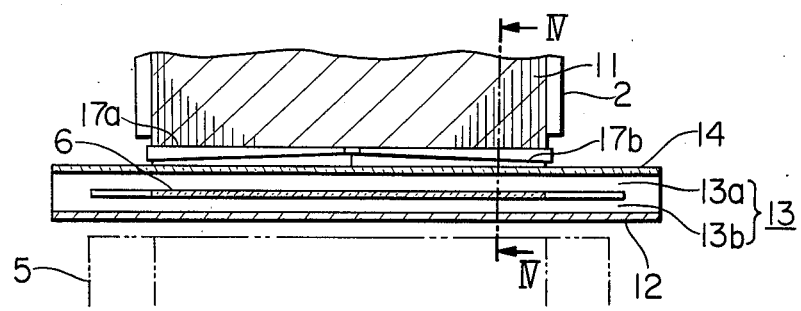
FIG. 3 is a longitudinal cross-sectional profile of one embodiment of an air gap winding rotating electric machine according to the present invention.
Figure 4:
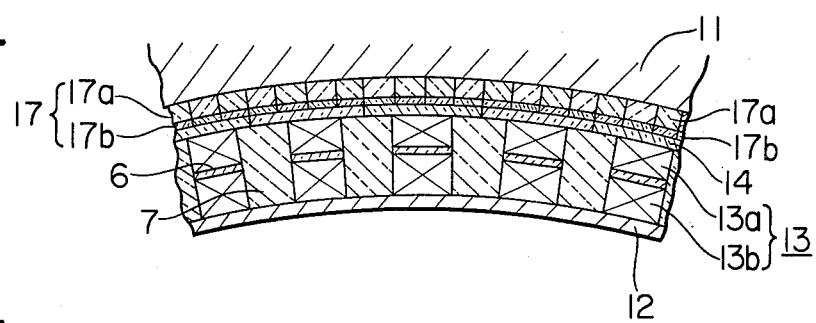
FIG. 4 is a cross-sectional view of the embodiment of FIG. 3 taken along line IV—IV, showing in greater detail the disposition of the stator coils in the present invention.

As can be seen from FIG. 3, at any cross section there are two axially aligned pairs of taper keys 17 between the magnetic shield 11 and the outer electrically insulating plate 14, inserted from opposite axial ends. However, any desired number of pairs of taper keys may be used with the same effect. For example, at any cross section, a single pair of taper keys whose length spans the entire axial length of the magnetic shield 11 may be used, or 3 pairs of taper keys may be utilized.

Figure 6:
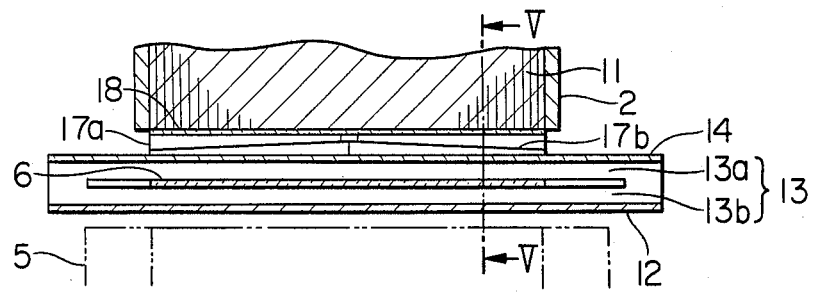
FIG. 6 is a longitudinal cross-sectional profile of a second embodiment of the present invention, in which a first bearing liner is disposed on the magnetic shield.
Figure 7:
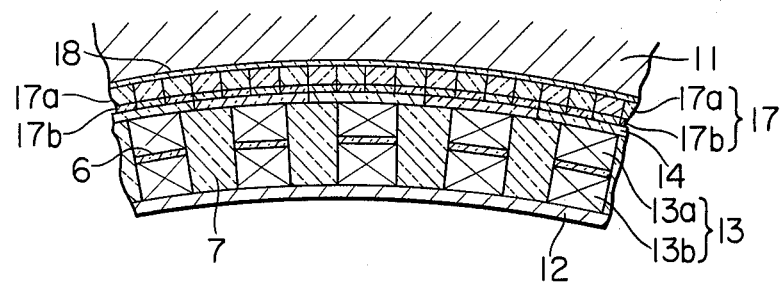
FIG. 7 is a cross-sectional view of the embodiment of FIG. 6 taken along line V—V, showing in detail the disposition of the stator coils in this second embodiment.
Figure 8:
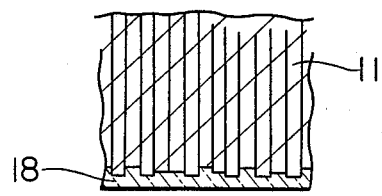
FIG. 8 is an enlarged view of a portion of FIG. 6, showing in detail the area of contact between the magnetic shield 11 and the first bearing liner.

FIGS. 6 through 8 show a second embodiment of the present invention in which a first bearing liner 18 is applied to the inner circumferential surface of the magnetic shield 11 for the purpose of providing a surface of low friction against which the outer taper key 17a contacts, thus reducing the force necessary to drive it into place. The first bearing liner 18 is formed of an electrically insulating material such as a thin epoxy resin glass cloth laminate. As shown in FIG. 8, the inner circumferential surface of the magnetic shield 11 is not perfectly smooth. The magnetic shield 11 is formed from numerous metal plates laminated together, and the inner surfaces of the steel plates vary from being flush with one another by up to 0.3 mm. The projections thus formed greatly increase the friction between the outer taper keys 17a and the magnetic shield 11. The first bearing liner 18 covers these projections and provides a smooth, uniform surface of low friction. A low coefficient of friction is desirable because the less force that is required to drive the outer taper key 17a into place, the less chance there is of injuring its end surface when it is pounded with a mallet when being inserted.

Another purpose of the first bearing liner 18 is to protect the inner circumferential surface of the magnetic shield 11. Before the magnetic shield 11 is assembled, the front and back surfaces of each of the metal plates comprising it are coated with an insulating film over which a varnish is baked, and the edge surfaces of each plate are coated with a varnish. The insulating film and varnish decrease overcurrent damage due to magnetic flux and prevent burning of the magnetic shield 11. The first bearing liner 18 thus prevents damage to the insulating film and the varnish by acting as a cushion between them and the taper keys 17.

Figure 9:
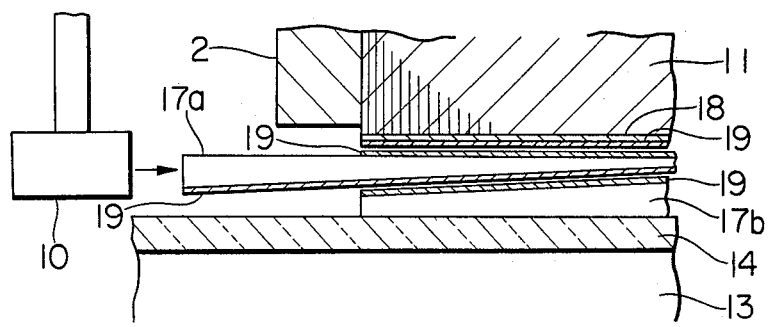
FIG. 9 is a longitudinal cross-sectional profile of a third embodiment of an air gap winding rotating electric machine according to the present invention, showing a second bearing liner and the method of inserting the taper keys.

In a small rotating electric machine, in which the forces necessary to drive the taper keys 17 into place are not so large, a first bearing liner 18 is sufficient. However as the size of the machine and the axial length of the magnetic shield 11 increases, the forces necessary to drive the taper keys 17 also increase, and in a large rotating electric machine, it may be desirable to provide a second bearing liner with a lower coefficient of friction than the first bearing liner 18. FIG. 9 shows a third embodiment of the present invention in which a second bearing liner 19 made of a low-friction fluoroplastic sheet is applied on the outer surface of the inner taper key 17b, on both the outer and inner surfaces of the outer taper key 17a, and on top of the first bearing liner 18. The fluoroplastic may be a material such as polytetrafluoroethylene (for example, Teflon of E. I. du Pont de Nemours, & Co.). The second bearing liner 19 lowers the coefficient of friction between contact surfaces to a very low level (approximately 0.05), so that even in a large machine, it is possible to drive the taper keys 17 into place without damage to the end surface of the outer taper keys 17a. Although in the embodiment shown in FIG. 9, the second bearing liner 19 is applied to both the first bearing liner and the outer surface of the outer taper key 17a, a single sheet, applied to either surface of contact, may be used. Alternatively, more than 2 sheets may be used. Similarly, the number of sheets of second bearing liner 19 applied between the outer taper key 17a and the inner taper key 17b is not restricted to two sheets. A single sheet may be used, applied to either surface, or more than 2 sheets may be used, as desired.

In the embodiments shown, taper keys 17 are provided about the entire inner circumference of the magnetic shield 11, but if necessary, the number of pairs of taper keys may be reduced.

What is claimed is:

1. An air gap winding rotating electric machine comprising:
   a rotor;
   a magnetic shield comprising a plurality of metal plates laminated together to form a hollow cylinder disposed around and coaxial with said rotor;
   a thin-walled electrically insulating cylinder disposed between said rotor and said magnetic shield, substantially surrounding and parallel to but not in contact with said rotor;
   a plurality of sets of stator coils disposed at a plurality of locations about the outer circumference of said insulating cylinder;
   a plurality of outer electrically insulating plates disposed about the outer circumference of said stator coils; and
   pairs of taper keys inserted between the inner circumferential surface of said magnetic shield and the outer circumferential surface of said outer electrically insulating plates, each of said pairs of taper keys aligned parallel to the axis of said rotor.

2. An air gap winding rotating electric machine as claimed in claim 1, wherein each pair of said taper keys comprises an inner taper key and an outer taper key of similar shape, said taper keys disposed so that the inner surface of the inner taper key is parallel to the outer surface of the outer taper key.

3. An air gap winding rotating electric machine as claimed in claim 2, wherein said thin-walled electrically insulating cylinder is made from epoxy resin fiber glass.

4. An air gap winding rotating electric machine as claimed in claim 3, wherein said taper keys are made of epoxy resin glass cloth laminate.

5. An air gap winding rotating electric machine as claimed in claim 4, further comprising a first bearing liner applied on the inner circumferential surface of said magnetic shield.

6. An air gap winding rotating electric machine as claimed in claim 5, wherein said first bearing liner is made of epoxy resin glass cloth laminate.

7. An air gap winding rotating electric machine as claimed in claim 6, further comprising a second bearing liner applied between said first bearing liner and said outer taper key and between said outer taper key and said inner taper key.

8. An air gap winding rotating electric machine as claimed in claim 7, wherein said second bearing liner is made from fluoroplastic sheet.

* * * * *